Patented May 21, 1929.

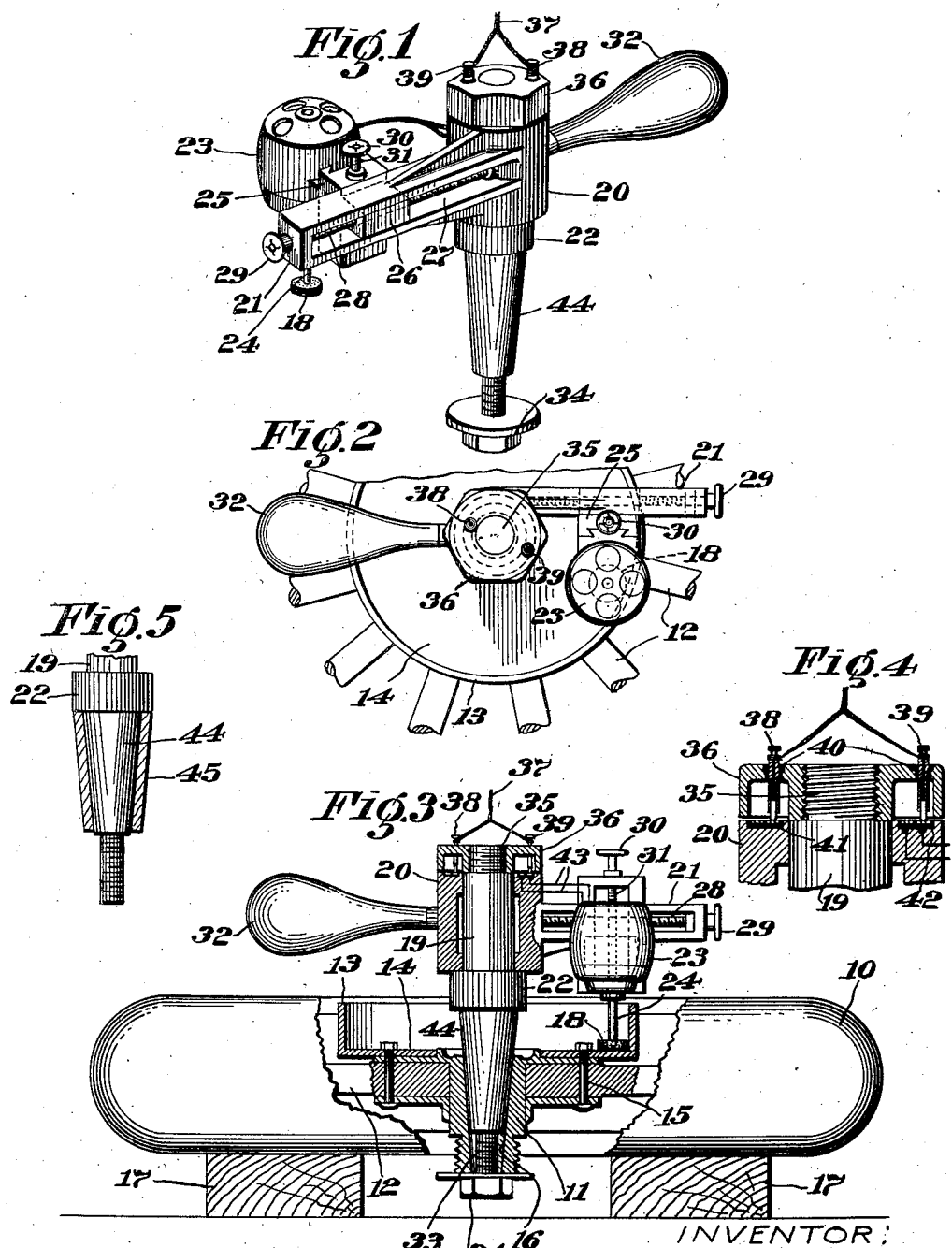

1,714,103

UNITED STATES PATENT OFFICE.

FREDERICK W. PARKS, OF FITCHBURG, MASSACHUSETTS.

BRAKE-DRUM-GRINDING DEVICE.

Application filed September 14, 1927. Serial No. 219,382.

This invention relates to mechanism for grinding the brake engaging surfaces of the brake drums upon automobile wheels, and more particularly to a small, portable grinding device adapted to be mounted upon an automobile wheel to perform the grinding operation.

It is well known that the brake drums of motor vehicles become scored or cut while in use. It is also well known that if the brake drum upon an automobile wheel is slightly out of round, or is disposed slightly eccentric to the wheel axis the brake band will exert a varying retarding force upon the automobile wheel.

A very slight variation in the concentricity of the drum may cause the wheel to lock in the same position each time the brake is applied, thus causing the vehicle to swerve from a straight line and also causing the tire to wear out rapidly.

When a brake drum becomes badly scored or difficulty is experienced in adjusting the brake due to the drum being eccentric or out of round, it has been the practice heretofore to correct this defect by placing the automobile wheel in a gap-lathe and rotating the wheel and drum while the latter is trued up by a lathe tool. These gap lathes, however, are too large and expensive to justify their use in the ordinary garage, and furthermore it is a difficult operation to true up a brake drum upon a lathe without removing an excessive amount of metal from the faces of the brake drum. Moreover a high carbon steel is now being used in the manufacture of brake drums and this steel is extremely difficult to turn smoothly in a lathe.

Having in mind the foregoing, the present invention relates to a small, inexpensive grinding device which may be readily attached to an automobile wheel to true up its brake drum.

The various features of the invention and novel combination of parts will be best understood from the following description when read in connection with the accompanying drawings illustrating one good practical form of the invention.
In the drawings:—

Fig. 1 is a perspective view of the complete grinding device;

Fig. 2 is a top plan view showing the device of Fig. 1 in its operative position upon an automobile wheel;

Fig. 3 is a side elevation showing the grinding device applied to an automobile wheel, the latter being shown partly in section;

Fig. 4 on an enlarged scale is a view of the upper portion of the supporting posts, parts being shown in section to disclose the electric contacts; and Fig. 5 is a side view of the lower end of the post, the sleeve thereon being shown in section.

The grinding device forming the subject matter of the present invention may be employed to grind the brake drums of variously constructed motor vehicle wheels, and is shown in the drawings as associated with an automobile wheel 10 of well known construction which wheel is provided with the usual hub 11 and spokes 12. The brake drum 13 is shown as having a flange portion 14 which is rigidly secured to the hub of the automobile wheel by the bolts 15 as is usual, and it is assumed that the wheel 10 is a rear wheel and is provided with the tapered bore 16 adapted to receive and to be rigidly secured to the tapered end of the rear axle of the automobile.

When either the inner or outer face of the brake drum 13 becomes scored or needs truing up, these faces of the drum may be readily ground by employing the device of the present invention which will now be described.

The motor vehicle wheel, the brake drum of which is to be ground, is removed from the automobile and may be placed upon supporting blocks 17, as shown in Fig. 3 of the drawing, and which blocks serve to support the wheel during the grinding operation. The grinding of the brake drum is effected by supporting a grinding wheel 18 so that the same may be advanced around the wheel in cutting engagement with either the inner or outer face of the brake drum. While various means might be provided for supporting the grinding wheel and advancing it around the brake drum, an extremely simple construction to this end is shown in the drawings and consists of a supporting post 19 the lower end of which is tapered to fit the tapered bore 16 of the automobile wheel, and the upper portion of this post is constructed to form a bearing adapted to receive the hub portion 20 of a laterally extending arm 21. The arrangement is such that the lower face of the hub 20 rests upon a shoulder 22 formed upon the supporting shaft, with the result that the arm is supported for rotative movement about the shaft 19.

Upon the arm 21 is mounted means for supporting and rotating the grinding wheel 18 and this means, in the construction shown, comprises an electric motor 23 of well known construction, having the downward extending shaft 24 to which the grinding wheel 18 is secured. It is desirable to adjust the grinding wheel 18 in a radial direction towards and from the central supporting shaft 19 in order to accommodate different sized brake drums, and also to move the wheel into cutting engagement with either the inner or outer face of the drum 13. It is also desirable to support the motor 23 for adjustment transversely of the supporting arm 21 to thereby feed the grinding wheel transversely of the drum either during the grinding operation, or to transfer the grinding wheel from the inner to the outer face of the drum.

In the construction shown adjustment of the motor 23 longitudinally of the arm 21 is effected by providing the supporting block 25 having a projecting portion 26 which is slidably mounted within the slot 27 formed lengthwise of the arm 21, and adjustment of the block 26 lengthwise of the slot 27 may be effected by rotating the adjusting screw 28 the opposite ends of which are journaled upon the arm 21, and at the outer end of this screw is provided a hand wheel 29 adapted to rotate the screw to effect the desired adjustment. The outer face of the block 25 is provided with a dove-tailed slot adapted to receive a similarly shaped projection upon the motor 23, the arrangement being such that the motor 23 is slidably mounted upon the block 25 and may be adjusted transversely of the supporting arm 21 by operating the hand wheel 30 which is secured to the adjusting screw 31. It may be desirable to counterbalance the weight of the laterally extending arm 21 and this may be done by providing a relatively heavy arm or projection 32 which extends laterally from the hub 20 in a direction opposite to the arm 21.

The central supporting shaft 19 should be accurately secured within the bore 16 of the automobile wheel and should be rigidly secured therein so as to prevent play between the shaft and wheel during the grinding operation and to this end, in the construction shown, the lower end of the shaft 19 is provided with the threaded extension 33 adapted to receive a nut 34 which abuts against the outer end of the hub 11 and may be screwed up to draw the lower tapered end of the shaft 19 tightly into the tapered bore of the automobile wheel. It is desirable to secure the hub 20 of the motor supporting arm to the shaft 19 so that movement of the hub lengthwise of its supporting shaft will be prevented, and this is accomplished in the construction shown by providing the upper end of the shaft 19 with the threaded extension 35 adapted to receive the threaded nut 36 which serves to hold the work supporting arm in place upon the shaft 19.

It will be apparent from the construction shown and described that rotation of the motor supporting arm 21 about its central shaft 19 will serve to advance the grinding wheel 18 about the brake drum to effect the desired grinding operation, and since the work supporting shaft 19 is accurately centered in the bore of the automobile wheel the grinding wheel will travel in a true circle. The work supporting arm may be rotated manually about its supporting shaft throughout the grinding operation, or if desired mechanical means (not shown) may be provided to this end. It will be apparent that the feed of the grinding wheel transversely of the drum 13 during the grinding operation may be effected by rotating the hand wheel 30, whereas the depth of cut may be controlled by rotating the hand wheel 29.

In the construction shown current for driving the electric motor 23 is supplied by the conductor wires 37 the ends of which wires are connected to the contact posts 38 and 39 which posts are mounted in the nut 36 but are insulated from the nut by the insulating sleeves 40. The lower end of one contact post 38 engages a contact ring 41 and the lower end of the other contact post 39 engages a contact ring 42. These rings are mounted upon the hub 20 but are insulated from each other and from the hub, and current is supplied to the motor 23 from the rings 41 and 42 by the conductor wires 43.

It is obvious that it may be desirable to use the grinding device of the present invention upon wheels having different size bores 16, and in order to meet this condition the lower tapered end 44 of the shaft 19 may be made sufficiently small to enter the smallest hub in which it may be desirable to secure the same, and if it is desired to mount the shaft 19 in automobile wheels having a larger hub it is merely necessary to place a tapered sleeve 45 of the desired size upon the shaft 19, as will be apparent from Fig. 5.

It will be seen from the foregoing that the drum grinding device of the present invention is simple in construction, consists of but few parts, may be manufactured at a comparatively small cost and takes up no floor space, all of which causes it to be extremely well adapted for use in the ordinary garage. Furthermore, since the construction shown serves to accurately center the post 19 within the hub of the automobile wheel, and the sleeve 20 is constructed to form a relatively long, stable bearing about the post, rotation of the arm 21 will move the grinding wheel in the path of a true circle and will cause it to grind the faces of the drum accurately.

It will also be apparent that through the use of a grinding wheel the faces of the drum 13 may be trued up better and more accurately than they can upon the turning lathes employed heretofore.

What is claimed is:—

1. A brake drum grinding device adapted to be mounted upon an automobile wheel and supported thereby during its drum grinding operation, comprising in combination, a supporting post constructed to be rigidly secured in the bore of the wheel hub, an arm rotatively supported by said post, a grinding wheel supported by said arm in position to grind the drum and adapted to be advanced by the arm in a circular path about said post in grinding contact with the drum, and means for rotating the grinding wheel.

2. A brake drum grinding device adapted to be mounted upon an automobile wheel and supported thereby during its drum grinding operation, comprising in combination, a supporting post constructed to fit the bore of the wheel hub and to be accurately centered therein, an arm secured to the post for rotative movement, a grinding wheel adjustably supported by said arm in position to grind the drum and adapted to be moved by the arm in a circular path about the post in grinding contact with the drum, and power means for rotating the grinding wheel.

3. A brake drum grinding device adapted to be mounted upon an automobile wheel and supported thereby during its drum grinding operation, comprising in combination, a supporting post constructed to be rigidly secured in the bore of the wheel hub, an arm rotatably supported by said post, a grinding wheel adjustably mounted upon said arm for movement into grinding engagement with the inner and outer faces of the drum and positioned to be advanced by the arm in a circular path around said drum, and means for rotating the grinding wheel.

4. A brake drum grinding device adapted to be mounted upon an automobile wheel to be supported thereby during its drum grinding operation, comprising in combination, a supporting post constructed to be centered in the bore of the wheel hub and supported by the wheel in an upright position, an arm secured to the post for rotative movement above the drum to be ground, a motor mounted upon said arm, and a grinding wheel driven by the motor and supported by the arm to be moved in a circular path about the post in grinding engagement with the brake drum.

5. A brake drum grinding device constructed to be mounted upon an automobile wheel and supported by the wheel during its drum grinding operation, comprising in combination, a supporting post having a tapered end adapted to fit the bore of the wheel hub and be accurately centered therein, a grinder supporting arm rotatably mounted upon said post, a grinding wheel supported by said arm to travel around the brake drum in grinding engagement therewith, and means for rotating the grinding wheel.

In testimony whereof, I have signed my name to this specification.

FREDERICK W. PARKS.